US010496676B2

(12) United States Patent
Mu et al.

(10) Patent No.: US 10,496,676 B2
(45) Date of Patent: Dec. 3, 2019

(54) SYNCHRONIZATION CACHE SEEDING

(71) Applicant: NetApp, Inc., Sunnyvale, CA (US)

(72) Inventors: Yuedong Mu, San Jose, CA (US); Ching-Yuk Paul Ngan, Redwood City, CA (US); Manoj V Sundararajan, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 588 days.

(21) Appl. No.: 14/473,081

(22) Filed: Aug. 29, 2014

(65) Prior Publication Data

US 2016/0063083 A1    Mar. 3, 2016

(51) Int. Cl.
*G06F 16/27*    (2019.01)
*H04L 29/08*    (2006.01)
*H04L 12/911*    (2013.01)
*G06F 11/20*    (2006.01)

(52) U.S. Cl.
CPC .......... *G06F 16/275* (2019.01); *H04L 47/828* (2013.01); *H04L 67/1078* (2013.01); *H04L 67/1095* (2013.01); *H04L 67/2842* (2013.01); *G06F 11/20* (2013.01); *G06F 11/2094* (2013.01); *G06F 16/27* (2019.01); *G06F 2201/82* (2013.01); *H04L 29/08* (2013.01)

(58) Field of Classification Search
None
See application file for complete search history.

(56) References Cited

U.S. PATENT DOCUMENTS

| 8,335,771 | B1 * | 12/2012 | Natanzon | G06F 17/30008 |
| | | | | 707/684 |
| 2007/0162462 | A1 * | 7/2007 | Zhang | G06F 17/30067 |
| 2007/0260733 | A1 * | 11/2007 | Havemose | G06F 11/1482 |
| | | | | 709/226 |
| 2009/0113059 | A1 * | 4/2009 | LoGalbo | H04L 63/029 |
| | | | | 709/227 |
| 2010/0106684 | A1 * | 4/2010 | Pizzo | G06F 17/30581 |
| | | | | 707/610 |
| 2011/0138166 | A1 * | 6/2011 | Peszek | G06F 21/575 |
| | | | | 713/2 |
| 2014/0095816 | A1 * | 4/2014 | Hsu | G06F 3/0655 |
| | | | | 711/162 |
| 2014/0173230 | A1 * | 6/2014 | Smith | H04L 67/1095 |
| | | | | 711/162 |
| 2015/0199240 | A1 * | 7/2015 | Singh | G06F 11/1451 |
| | | | | 711/162 |

* cited by examiner

*Primary Examiner* — Arpan P. Savla
*Assistant Examiner* — Soheila (Gina) Davanlou
(74) *Attorney, Agent, or Firm* — Cooper Legal Group, LLC (57) ABSTRACT

Synchronization metadata is read from non-volatile storage. The synchronization metadata comprises indications of one or more synchronization targets. A synchronization target is a node of a clustered storage system. A synchronization cache is populated with the synchronization metadata. After populating the synchronization cache with at least a portion of the synchronization metadata, a connection to a network is established. After the connection to the network is established, a connection to a first of the one or more synchronization targets is established.

20 Claims, 6 Drawing Sheets

SYNCHRONIZATION CACHE SEEDING

BACKGROUND

Aspects of the disclosures herein generally relate to the field of data storage, and, more particularly, to clustered storage systems.

A clustered storage system typically includes two or more clusters of one or more nodes. Clustered storage systems can be used to maintain a flexible architecture while also providing high availability (i.e., redundancy). Consider an example clustered storage system comprising two clusters with each cluster comprising two nodes. The first cluster is geographically located near a group of users (e.g., a company's office building) while the second cluster is geographically located a significant distance from the group of users (e.g., several hundred miles away). The clusters employ synchronization such that the data stored in the second cluster mirrors the data in the first cluster. For example, if the first cluster receives a write operation and associated data, the first cluster writes the data to storage devices associated with the first cluster. The first cluster also replicates the write operation to the second cluster, allowing the second cluster to perform the same operation. The second cluster thus writes the data to storage devices associated with the second cluster. If the first cluster becomes unavailable to the users (e.g., suffers a failure resulting in the first cluster being inaccessible), the users can access the second cluster instead. Because all changes to data are replicated to the second cluster, the second cluster can take the place of the first cluster until the first cluster is available again.

BRIEF DESCRIPTION OF THE DRAWINGS

The disclosures herein may be better understood, and features made apparent to those skilled in the art by referencing the accompanying drawings.

DESCRIPTION OF EXAMPLE ILLUSTRATION(S)

The description that follows includes example systems, methods, techniques, instruction sequences and computer program products that embody techniques of the disclosures herein. However, it is understood that the described examples may be practiced without these specific details. For instance, although examples refer to replicating write operation, any kind of operation that results in a change to data can be replicated. In other instances, well-known instruction instances, protocols, structures and techniques have not been shown in detail in order not to obfuscate the description.

The nodes of a cluster include a set of storage devices on which data can be stored. Some clusters might distribute data between nodes or storage devices. For example, part of a file can be stored on a storage device associated with the first node while another part of the file might be stored on a storage device associated with the second node. Similarly, instead of the second node storing part of the file on a single storage device, the second node might distribute the data to multiple storage devices. Further, each node can be configured to receive input/output (I/O) operations. If data associated with an I/O operation is stored on another node, the receiving node can forward the I/O operation to the other node.

Synchronization typically applies to I/O operations that modify data, such as a write operation. While there are a variety of I/O operations that modify data, the illustrations herein will use write operations as examples of I/O operations that modify data. The illustrations, however, can be adapted to work with any operation that modifies data, or, more broadly, are subject to synchronization.

Synchronization operations can be categorized according to various characteristics, including whether they are atomic or non-atomic. The atomicity of a synchronization operation can be specified globally (i.e., for the entire clustered storage system), based on a grouping of data (such as a file), per write operation, etc. When data is subject to atomic synchronization, an acknowledgement that a write operation completed is not returned to a client until the write operation has been replicated to the other cluster. For example, a node of a first cluster receives a write operation and associated data. The node of the first cluster writes the data to a storage device. The node of the first cluster replicates the write operation (along with the associated data) to a second cluster (which can occur contemporaneously with the writing of the data to the storage device). However, instead of sending an acknowledgement that the write operation completed after writing the data to the storage device, the node of the first cluster waits until receiving an acknowledgement from the second cluster that the data has been written to a storage device located in the second cluster. Thus, the client does not receive an acknowledgement that the write completed until the associated data is stored in both clusters. If the synchronization is non-atomic, on the other hand, the node of the first cluster does not wait for an acknowledgement from the second cluster. Instead, the node of the first cluster sends an acknowledgement after writing the data to a storage device.

As described above, the atomicity of a synchronization operation can be specified based on a grouping of data. The illustrations herein will refer to groupings of data called "consistency groups". Consistency groups are generally groupings of files and in some aspects, can come in two forms: replication-critical consistency groups and replication-non-critical consistency groups. Replication-critical consistency groups identify files that are subject to atomic synchronization and replication-non-critical consistency groups identify files that are subject to non-atomic synchronization. In some aspects, files not located in a consistency group are not subject to synchronization at all.

Consistency groups can be associated with "endpoints". Endpoints are the locations at which consistency group data is stored. For example, if a clustered storage system comprises two clusters, each cluster can include an endpoint for consistency groups defined in the clustered storage system. Each node that includes an endpoint is referred to as a "synchronization target".

If a file that is part of a replication-critical consistency group is modified, the node that received the write operation does not acknowledge completion of the write operation until receiving acknowledgement that the write operation was completed at other consistency group endpoints. If a file that is part of a replication-non-critical consistency group is modified, the node that received the write operation acknowledges completion of the write operation once the write operation is completed on the receiving node. While modifications to the replication-non-critical consistency groups are still replicated to the other endpoints, the receiving node does not wait until receiving an acknowledgement from the other synchronization targets before sending an acknowledgement. If a file that is not part of a consistency group is modified, the modification is not replicated and the receiving node acknowledges completion of the write operation once the write operation is completed on the receiving node.

Nodes maintain synchronization metadata in a synchronization cache. In some instances, synchronization metadata includes data that allows the node to determine whether data associated with a particular write operation is part of a consistency group, what type the consistency group is, and where the consistency group endpoints are located. If the synchronization metadata changes, the changes are replicated to other nodes. For example, a consistency group endpoint might be migrated from one node to another. Updated synchronization metadata indicating the new consistency group endpoint is communicated to other nodes. Thus, nodes will replicate write operations associated with the consistency group to the new endpoint. The use of the synchronization metadata allows the nodes to efficiently determine where write operations should be replicated to. While the synchronization metadata is typically stored in fast, volatile storage, such as Random Access Memory (RAM), the synchronization metadata can be backed up to non-volatile storage, such as a hard drive. Thus, if a node reboots, the synchronization metadata can be loaded from non-volatile storage. However, the design of a node's boot process, or the boot process of a computing system in general, can result in a node being able to receive write commands before the synchronization metadata is loaded. If the node can receive write commands prior to loading the synchronization metadata, the write command cannot be processed because the node cannot determine if the write command should be replicated, where it should be replicated to, etc.

When a node (or computing system in general) is booted (or rebooted), the node becomes available to receive network traffic after the node connects to a network. The networking subsystem typically establishes a connection to networks early on in the boot process, before the synchronization metadata is loaded. If the node receives a write operation before the synchronization metadata is loaded, the node cannot determine whether the data associated with the write operation is part of a consistency group, where the endpoints of the consistency group are, or the current status of the endpoints. Thus, the node cannot acknowledge the completion of any write operation until the synchronization metadata is loaded. Further, even if the synchronization metadata is loaded, the node cannot replicate data to a synchronization target until a connection with the synchronization target has been established. Thus, the node cannot acknowledge completion of any write operation that affects a replication-critical consistency group until a connection is established with the appropriate synchronization targets.

The options available to a node that receives write operations prior to loading the synchronization metadata or establishing connections to synchronization targets are limited: the node can either respond to the client with an error or not respond until the synchronization metadata is loaded or connections to synchronization targets are established. Neither option is particularly satisfactory. For example, responding with an error can result in unexpected program behavior, user confusion, etc. Not responding to the client can result in similar scenarios. For example, some network protocols might stop sending data from the client to the node until an acknowledgement is received from the node. If the acknowledgement takes too long, the user might assume that the program/client has crashed or the program may, in fact, crash. Even if the potential problems are ignored, the preferred outcome when a node receives any I/O operation is to perform the operation and respond to the client as quickly as possible.

A clustered storage system can be designed to efficiently establish connections between a booting node and the other nodes of the cluster. To reduce the number of I/O operations received before the connections are established, the booting node begins loading the synchronization metadata before loading the networking subsystem. At least a portion of the synchronization metadata can be loaded before the networking subsystem is operational, allowing the booting node to begin establishing connections to other nodes once the networking subsystem is operational. Because the length of time between when the networking subsystem is operational and the connections are established is reduced, the number of I/O operations received before the connections are established is also reduced. Further, even if I/O operations are received prior to the establishment of a connection used for the I/O operation, the time that the I/O operation is stalled is also reduced. To facilitate the loading of the synchronization metadata, the synchronization metadata can be stored in a manner that reduced the amount of time taken to read the synchronization metadata from non-volatile storage. Further, the synchronization metadata can be arranged such that the synchronization metadata used to establish connections between nodes is read from the non-volatile storage first.

Figure 1:
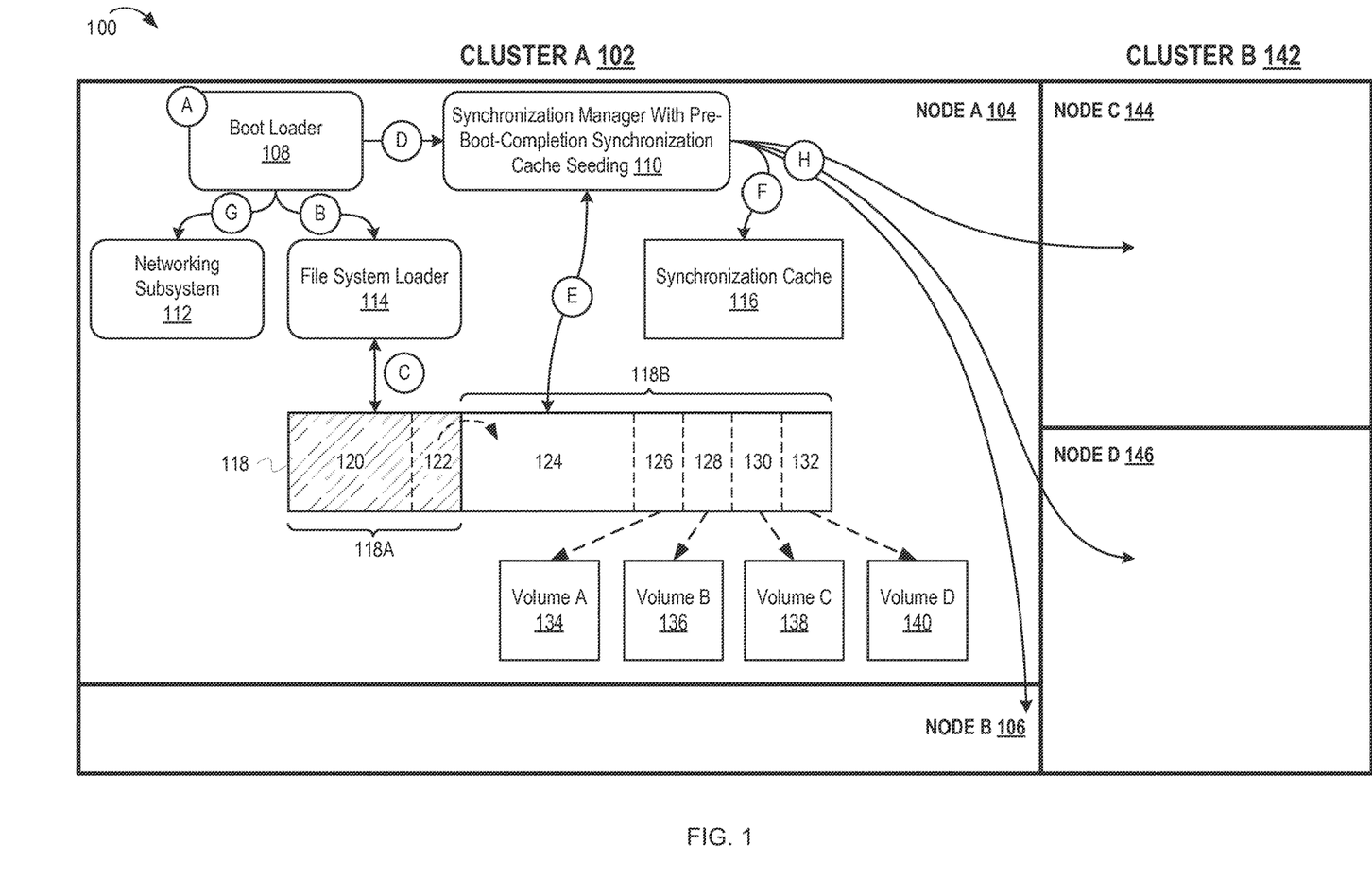
FIG. 1 depicts a clustered storage system with a synchronization manager with pre-boot-completion synchronization cache seeding.

FIG. 1 depicts a clustered storage system with a synchronization manager with pre-boot-completion synchronization cache seeding. FIG. 1 depicts a clustered storage system 100, including two clusters, cluster A 102 and cluster B 142. Cluster A 102 includes node A 104 and node B 106. Cluster B 142 includes node C 144 and node D 146. FIG. 1 also depicts a configuration of node A 104. Node B 106, node C 144 and node D 146 can be configured similarly to node A 104 or can be configured differently. The example illustrations will assume that node B 106, node C 144, and node D 146 are configured similarly to node A 104.

Node A 104 includes a boot loader 108, a synchronization manager with pre-boot-completion synchronization cache seeding (hereinafter "synchronization manager") 110, a networking subsystem 112, and a file system loader 114. The boot loader 108 is responsible for loading at least a portion of the software that operates node A 104, which can include the operating system (not depicted). The synchronization manager 110 performs operations related to synchronization between nodes. The networking subsystem 112 performs operations related to networking, including establishing a connection to one or more networks and providing an interface to networking hardware. The file system loader 114 performs operations that allow file system(s) to be accessed by other components, such as the synchronization manager 110, the networking subsystem 112, etc.

Node A 104 also includes a synchronization cache 116, which holds synchronization metadata. The synchronization cache 116 is typically located in fast, volatile storage, such as RAM. The synchronization metadata can also be stored in non-volatile storage, such as non-volatile RAM (NVRAM), or stored in multiple locations. For example, a working copy of the synchronization metadata used by the various components might be located in RAM, while a backup copy is located in NVRAM.

Node A 104 also includes a file system 118 (or a portion thereof), which can be located on one or more storage devices that are part of node A 104 (not depicted). The file system 118 comprises aggregate metadata 118A and an aggregate file system 118B. The aggregate metadata 118A includes general metadata 120 and an aggregate file system reference (hereinafter "file system reference") 122. The aggregate metadata 118A contains data used by the file system loader 114 to allow other components to access the aggregate file system 118B. The file system reference 122 points to the location(s) at which the aggregate file system 118B can be accessed. The aggregate file system 118B includes synchronization metadata 124 and volume references 126, 128, 130, and 132. The volume references 126, 128, 130, and 132 point to volume A 134, volume B 136, volume C 138, and volume D 140, respectively. The example illustrated in FIG. 1 shows four volume references pointing at four volumes. Other examples having more or fewer volumes and volume references are possible and within the scope of the disclosure.

The aggregate metadata 118A is similar to a master boot record, and the volumes 134, 136, 138, and 140 are similar to partitions. A master boot record is typically located at the beginning of a storage device, such as a hard drive. The master boot record includes metadata describing how data is partitioned on the storage device and the address of each individual partition. The master boot record is stored at a known location on the storage device, allowing a computing system to access the master boot record without referring to other data. Thus, the computing system can read the master boot record and determine where data, such as operating system data, is located on the storage device. The layout of the data on the storage device can thus vary as long as the master boot record is stored at the known location. The aggregate metadata 118A serves a similar function by defining the layout of the volumes, allowing the file system loader 114 to perform operations to load and access the data within the file system 118.

The file system 118 is a logical construct that can include physical locations located on one or more storage devices. Although the constituent logical divisions of the file system 118 are depicted in FIG. 1 as being sequential, the logical divisions need not be located in sequential physical locations or even on a single storage device.

Stages A-G depict a set of example operations for determining and connecting to synchronization targets. As described above, a synchronization target is any node within a clustered storage system that data might be replicated to. At stage A, the boot loader 108 is loaded and a boot loader process initiated. The boot loader 108 can be stored in non-volatile memory, such as read-only memory ("ROM") as software or firmware. When the hardware comprising node A 104 receives an indication that node A 104 should be booted, the hardware loads the code comprising the boot loader 108 into a location accessible by one or more node processors (not depicted), such as RAM. The processors then begin executing the boot loader code. The boot loader 108 can perform an assortment of operations. For example, the boot loader 108 might first load a device driver that allows other software to access the storage devices associated with the node A 104. For the purposes of the illustrations herein, it is assumed that, at stage A, the boot loader 108 loads any software or firmware that allows components within node A 104 to access the storage device(s) on which the file system 118 is stored.

At stage B, the boot loader 108 loads the file system loader 114 and initiates operation of the file system loader 114. The mechanism by which the boot loader 108 loads the file system loader 114 can vary. For example, the boot loader 108 can include instructions that, when executed, result in the file system loader 114 being loaded into RAM. The file system loader 114 might be incorporated as part of the boot loader 108 as well, resulting in the file system loader 114 being loaded when the boot loader 108 itself is loaded. To initiate operation of the file system loader 114, one or more instructions can be executed that result in file system loader instructions being executed by the processors. Similarly, the boot loader 108 can make one or more system calls, function calls, etc., that begin the loading or initiation of the file system loader 114.

At stage C, the file system loader 114 loads the aggregate metadata 118A. To load the aggregate metadata 118A, the file system loader 114 reads the aggregate metadata 118A from one or more storage devices. The aggregate metadata 118A can be stored at one or more particular locations on the storage devices known to the file system loader 114. For example, if node A 104 only includes a single hard drive as a storage device, the aggregate metadata 118A might be begin at the first sector of the first track of the storage device. If node A 104 includes multiple storage devices, the aggregate metadata 118A might be similarly located on a storage device designated as the first storage device. Further, the location at which the aggregate metadata 118A is stored can be indicated by a value read by the file system loader 114. The aggregate metadata 118A includes metadata that allows the aggregate file system 118B or portions thereof to be accessed (such as the file system reference 122). Thus, when the file system loader 114 has loaded the aggregate metadata 118A, other components can access the aggregate metadata 118A.

At stage D, the boot loader 108 loads the synchronization manager 110 if the synchronization manager 110 is not already loaded and initiates operation of the synchronization manager 110. The boot loader 108 can load and initiate the synchronization manager 110 using mechanisms similar to those used to load the file system loader 114. Because the boot loader 108 can access the aggregate file system 118B after stage C, the synchronization manager 110 can be loaded from the aggregate file system 118B. The synchronization manager 110 can also be loaded from a known location, similar to how the aggregate metadata 118A is loaded.

At stage E, the synchronization manager 110 reads the synchronization metadata 124 from the aggregate file system 118B. To read the synchronization metadata 124, the synchronization manager 110 reads the synchronization metadata 124 from a location on a storage device referenced by the file system reference 122. The synchronization metadata 124 can be stored at a single location, multiple sequential locations, or at multiple non-sequential locations. Thus, the file system reference 122 can take various forms, including a single address, an address and an offset/length, multiple addresses, etc. The file system reference 122 can point specifically to a physical location in storage or be a virtual address that is translated by another component, such as a file system manager.

At stage F, the synchronization manager 110 populates the synchronization cache 116 with the synchronization metadata 124. While the synchronization metadata 124 can vary, the synchronization metadata 124 includes metadata to allow the node A 104 to determine whether data referenced by a write operation is part of a consistency group and determine which synchronization targets contain the consistency group endpoints. Thus, the synchronization metadata 124 indicates each consistency group (or each consistency group with an endpoint on node A 104), whether each consistency group is a replication-critical consistency group or a replication-non-critical consistency group, and an indication of each node associated with the endpoints of each consistency group. The indication of each node can be an IP address or other value as long as the indication allows the synchronization manager 110 to communicate with the nodes.

At stage G, the boot loader 108 loads the networking subsystem 112 if the networking subsystem 112 is not already loaded and initiates the operation of the networking subsystem 112. The networking subsystem 112 includes the software, firmware, and hardware used to connect to, and communicate with, one or more networks. For example, the networking subsystem 112 might include an Ethernet card, firmware on the Ethernet card, operating system software that interacts with the firmware, etc.

Similar to initiating the operation of the file system loader 114, operation of the networking subsystem 112 can be initiated by referencing one or more instructions associated with the networking subsystem 112. Similarly, the boot loader 108 can make one or more system calls, function calls, etc., that begin the loading and/or initiation of the networking subsystem 112 operations. As part of the initiation, the networking subsystem 112 can perform operations to begin communicating with one or more networks, such as reading configuration files, connecting to the one or more networks, acquiring an Internet Protocol ("IP") address, etc. Once the operation of the networking subsystem 112 has been initiated, node A 104 (and its constituent components) can send and receive messages over the one or more networks.

At stage H, the synchronization manager 110 determines that the networking subsystem 112 is operational and attempts to connect to the other nodes of the clustered storage system 100. The synchronization manager 110 can determine that the networking subsystem 112 is operational by polling the networking subsystem 112, registering a callback function, etc. For example, after the synchronization manager 110 is initiated at stage D, the synchronization manager 110 can periodically send messages to the networking subsystem 112 that request the status of the networking subsystem 112 until receiving a response indicating that the networking subsystem 112 is operational.

Once the synchronization manager 110 has determined that the networking subsystem 112 is operational, the synchronization manager 110 attempts to connect to the other nodes of the clustered storage system 100. As described above, the synchronization metadata 124 includes data used to connect to the synchronization targets. The synchronization manager 110 identifies the synchronization targets by reading at least a portion of the synchronization metadata 124 stored in the synchronization cache 116. Using the data, the synchronization manager 110 performs operations to connect to the identified synchronization targets. For example, the synchronization manager 110 might use a cluster identifier or node identifier to send one or more messages over a network to an identified synchronization target. The specific operations performed and message sent can vary depending on network protocols implemented, hardware configuration, software configuration, etc.

While populating the synchronization cache 116 with metadata indicating whether each consistency group is a replication-critical consistency group can facilitate determining which nodes that node A 104 should connect to, it also has an impact on processing I/O operations that are not replicated. Consider a scenario in which an I/O operation is received by node A 104 before the synchronization metadata 124 is loaded. Not only has node A 104 not connected to other nodes with related consistency group endpoints, but node A 104 does not know whether the I/O operation is associated with a replication-non-critical consistency group. Thus, if the processing of an I/O operation on node A 104 itself relies on a determination of whether the I/O operation is associated with a replication-critical or replication-non-critical consistency group, processing of the I/O operation is delayed even if it should not be replicated. Populating the synchronization cache 116 as soon as possible can allow node A 104 to determine that a particular I/O operation is associated with a replication-non-critical consistency group earlier, allowing the I/O operation to be processed by node A 104 earlier as well, even if the I/O operation is not replicated.

While node A 104 is depicted as attempting to connect to all nodes of the clustered storage system 100, this can vary. For example, some clustered storage systems create a network of nodes in which each node is connected to all other nodes, while some clustered storage systems include nodes that only connect to a subset of nodes. Further, some clustered storage systems can connect to other nodes based on a priority assigned to each node. For example, consider a clustered storage system in which a node connects to all other nodes within the clustered storage system. Even though the node connects to all other nodes, only a subset of the nodes might contain consistency group endpoints associated with data located on the node. As such, the node might initially connect to only the subset of nodes containing consistency group endpoints associated with data located on the node. Then, at a later point, the node connects to the nodes that do not contain consistency group endpoints associated with data located on the node.

The boot loader 108, synchronization manager 110, networking subsystem 112, and file system loader 114 are logical constructs that can vary. For example, the file system loader 114 might be part of the boot loader 108. As another example, the portion of the synchronization manager 110 responsible for the operations described above can be part of the boot loader 108, as opposed to a component of the synchronization manager 110. As another example, the synchronization manager 110, networking subsystem 112, etc. can be part of another component, such as an operating system.

As described above, the configuration of the nodes can vary. If the configurations of node B 106, node C 144, and node D 146 differ from the configuration of node A 104, then node B 106, node C 144, and node D 146 can be at least configured to be compatible with the operations performed by node A 104. The operations described above can also be adapted based on the configuration of node B 106, node C 144, and node D 146.

The specific layout and contents of the aggregate metadata 118A and the aggregate file system 118B can vary. For example, the file system reference 122 can point to metadata stored in the aggregate file system 118B. The metadata stored in the aggregate file system 118B might then include a reference to the actual synchronization metadata 124. In other words, multiple references might be resolved while locating the synchronization metadata 124.

Figure 2:
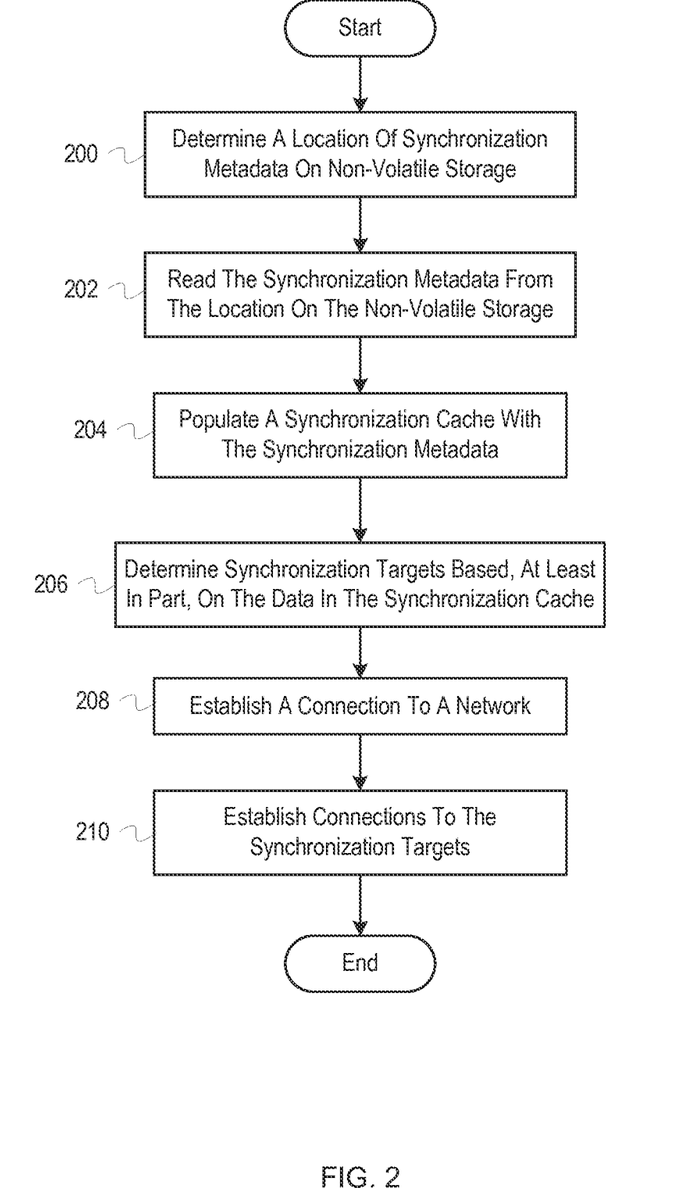
FIG. 2 depicts a flowchart of example operations for determining and connecting to synchronization targets.

FIG. 2 depicts a flowchart of example operations for determining and connecting to synchronization targets. The operations depicted in FIG. 2 can be performed by node A 104 of FIG. 1 or another component of a clustered storage system.

At block 200, the location of synchronization metadata on non-volatile storage is determined. The non-volatile storage can be a hard drive, a solid state drive, NV-RAM, etc. The location of the synchronization metadata can be indicated in a variety of ways. For example, a particular storage device and a particular location on the storage device might be specified. As another example, the location of the synchronization metadata can be a memory address or other value that is translated by another component into the physical location of the synchronization metadata. The synchronization metadata location can be stored as part of aggregate metadata, configuration settings, hard-coded, etc. After the location of the synchronization metadata on the non-volatile storage is determined, control then flows to block 202.

At block 202, the synchronization metadata is read from the location on the non-volatile storage. The synchronization metadata includes indications of consistency groups, consistency group endpoints, and which nodes the consistency group endpoints are located on. The specific synchronization metadata stored on the non-volatile storage can vary depending on the metadata used to establish a connection with a node that includes a consistency group endpoint. The synchronization metadata also includes data that facilitates determination of whether a write operation references data within a consistency group or data that indicates the most recently known status of the relevant consistency group endpoints. For example, the synchronization metadata can indicate whether a particular consistency group endpoint is synchronized with the other consistency group endpoints. After the synchronization metadata is read from the location on the non-volatile storage, control then flows to block 204.

At block 204, a synchronization cache is populated with the synchronization metadata. To populate the synchronization cache, memory for the synchronization cache is allocated. After the memory is allocated, the synchronization metadata is written to the allocated memory. The format of the synchronization cache can vary. For example, the synchronization cache might include the consistency group endpoints as well as a separate list of synchronization targets, as described in more detail below. Thus, the synchronization cache might include two different tables: a table mapping consistency group endpoints to the synchronization targets on which the consistency group endpoints are located and a table that includes a list of unique individual synchronization targets that have consistency group endpoints. In some scenarios, however, the synchronization cache might only include a table mapping consistency group endpoints to the nodes on which the consistency group endpoints are located. Similarly, the synchronization cache might include additional data, such as synchronization target status and configuration data. The data stored in the synchronization cache can be stored as individual values or within a data structure, such as a table. Populating the synchronization cache with the synchronization metadata can include any operations for transforming the synchronization data between the format in which it is stored on the non-volatile storage and the format in which it is stored in the synchronization cache. After the synchronization cache is populated with the synchronization metadata, control then flows to block 206.

At block 206, synchronization targets are determined based, at least in part, on the data in the synchronization cache. The operations used to determine the synchronization targets can vary depending on the data stored in the synchronization cache. For example, the synchronization targets can be included in an independent list that includes an entry for each unique synchronization target. In such instances, the list of synchronization targets can be read from the synchronization cache and iterated through. Alternatively, the synchronization targets can be indicated in a table mapping consistency group endpoints to the synchronization targets. Because multiple consistency group endpoints can exist on the same synchronization target, the table could include multiple entries that indicate the same synchronization target. In such instances, the table can be read from the synchronization cache and the unique synchronization targets determined from the table. After the synchronization targets are determined based, at least in part, on the synchronization cache data, control then flows to block 208.

At block 208, a connection is established to a network. The specific operations performed can vary depending on the type of network and configuration. For example, the operations performed to connect to a storage area network ("SAN") can vary from the operations performed to connect to a network attached storage ("NAS") network. Similarly, the operations performed to connect to a SAN that uses Fibre Channel can vary from the operations performed to connect to a SAN that uses the Internet Small Computer System Interface ("iSCSI"). Typical operations performed to establish a connection to a network include the reading and loading of configuration data, procurement of a network identifier, and communicating with one or more network devices. After the connection is established to the network, control then flows to block 210.

At block 210, connections are established to the synchronization targets. To connect to a synchronization target, one or more messages are sent to and received from the synchronization target according to a protocol implemented by the synchronization targets. Other operations can be performed as part of establishing connections to the synchronization targets, such as verifying that the synchronization metadata is current. After connections are established to the synchronization targets, the process ends.

The illustrations herein generally refer to establishing a connection to a single network. However, connections might be made to multiple networks. For the purposes of the illustrations herein, the network that is connected to by a node is one that allows clients to send I/O operations to the node or allows for the node to communicate with the nodes of a clustered storage system. If the node communicates with other nodes via different networks, the node can establish connections with the different networks.

Figure 3:
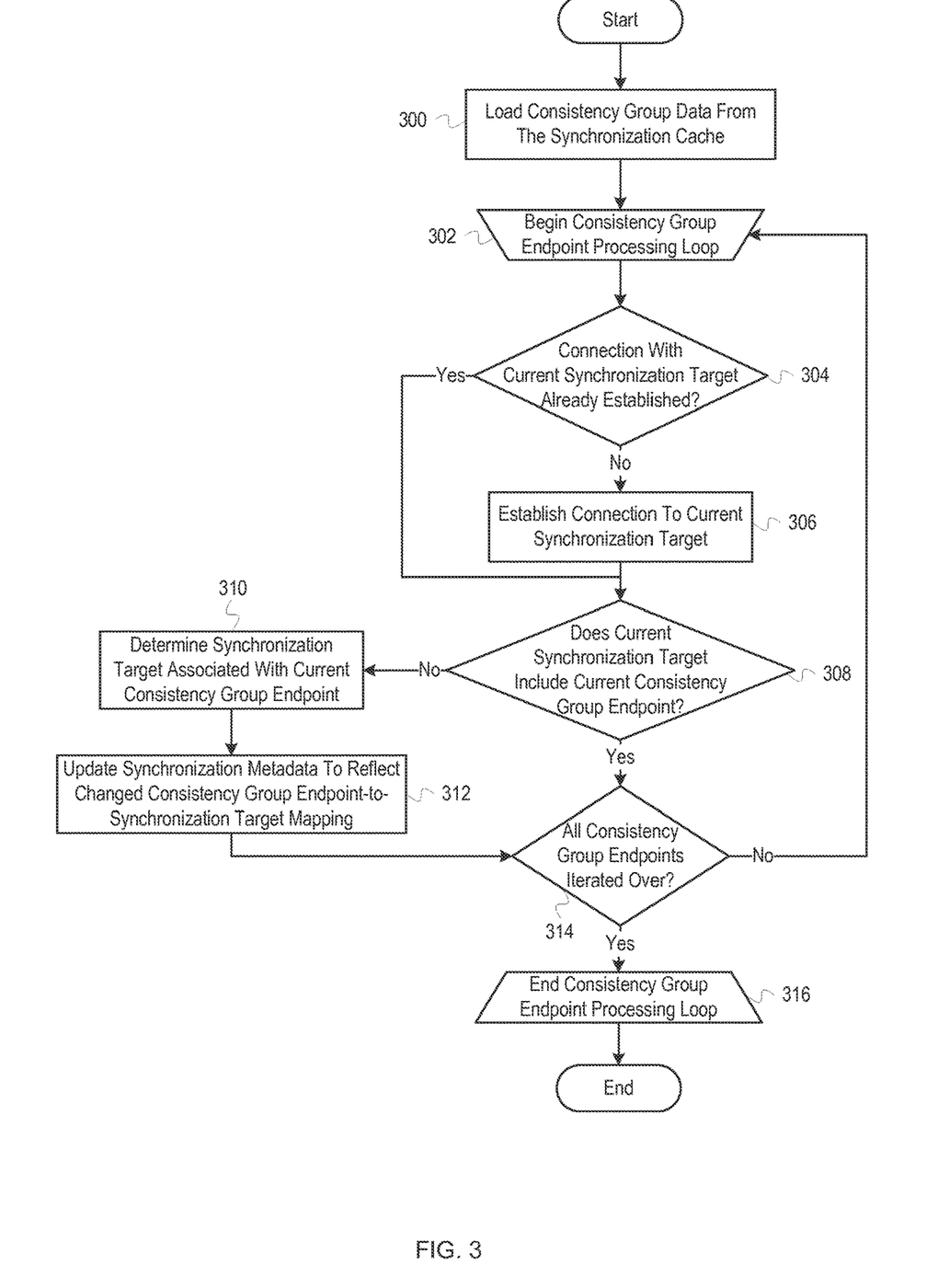
FIG. 3 depicts a flowchart of example operations for connecting to synchronization targets.

FIG. 3 depicts a flowchart of example operations for connecting to synchronization targets. The operations depicted in FIG. 3 can be performed by node A 104 of FIG. 1 or another component of a clustered storage system.

At block 300, consistency group data is loaded from the synchronization cache. The consistency group data can identify mappings between consistency groups and nodes that have data associated with consistency group endpoints. Thus, for example, the consistency group data can identify nodes that are associated with consistency group endpoints. The consistency group data can also include status data for the consistency group endpoints. The consistency group endpoint status data is relevant once a node starts receiving write operations because the status data can indicate that a consistency group endpoint is unavailable. After the consistency group data is loaded from the synchronization cache, control then flows to block 302.

At block 302, a consistency group endpoint processing loop (hereinafter "processing loop") begins. During the processing loop, the consistency group data is iterated over to determine and connect to the nodes associated with consistency group endpoints. The specific details of the loop can vary based on the format of the consistency group data. For example, if each consistency group is associated with only one endpoint (besides a local endpoint), each consistency group can be iterated over by the processing loop. If each consistency group is associated with more than one endpoint, the processing loop might comprise an outer loop to iterate over the consistency groups and an inner loop to iterate over the individual endpoints associated with the particular consistency group. The processing loop depicted here assumes that the consistency group data includes an entry for each consistency group-to-endpoint mapping. Thus, if a consistency group has two endpoints, there would be two entries in the consistency group data, one for each endpoint. The operations described herein can be adapted to other data formats.

When the processing loop begins, the first consistency group endpoint from the consistency group data becomes the current consistency group endpoint (hereinafter "current endpoint"). The current endpoint is mapped to a synchronization target, which becomes the current synchronization target. On each subsequent pass though block 302, the current endpoint is updated to be the next consistency group endpoint in the consistency group data. The current synchronization target is also updated to be the synchronization target associated with the new current endpoint. After the current endpoint and current synchronization target are updated, control then flows to block 304.

At block 304, it is determined whether a connection with the current synchronization target has been established. Because a synchronization target can include many consistency group endpoints, a connection might have been established with the current synchronization target during a prior iteration for a different consistency group endpoint. If a connection with the current synchronization target has already been established, no additional connection is established, generally. The operations depicted can be adapted for scenarios in which an additional connection is established. If it is determined that no connection with the current synchronization target has been established, control then flows to block 306. If it is determined that a connection with the current synchronization target has been established, control then flows to block 308.

At block 306, a connection to the current synchronization target is established. The connection to the current synchronization target can be established in a manner substantially similar to that described above. For example, a cluster identifier or node identifier may be used to send one or more messages over a network to the current synchronization target. The specific operations performed and message sent to establish a connection with the current synchronization target can vary depending on network protocols implemented, hardware configuration, software configuration, etc. After the connection to the current synchronization target is established, control then flows to block 308.

Control flowed to block 308 if it was determined, at block 304, that a connection with the current synchronization target has already been established. Control also flowed to block 308 from block 306. At block 308, it is determined whether the current synchronization target includes the current endpoint. As described above, consistency group endpoints can be moved between synchronization targets. Thus, this check is performed to catch scenarios in which the current endpoint was moved to another synchronization point. To determine whether the current synchronization target includes the current endpoint, one or more messages indicating the current endpoint can be sent to the current synchronization target. The current synchronization target can indicate whether the current synchronization target has the current endpoint in one or more reply messages. If it is determined that the current synchronization target does not include the current endpoint, control then flows to block 310. If it is determined that the current synchronization target does include the current endpoint, control then flows to block 314.

At block 310, the synchronization target associated with the current endpoint is determined. To determine the new synchronization target associated with the current endpoint, one or more messages can be sent to one or more nodes requesting updated data. The messages can specify the current endpoint or request updated data for all endpoints. The specific operations can vary, however. For example, a message can be sent to each node in which each node is asked whether the current endpoint resides on the respective node. If the current synchronization target (i.e., the node that formerly had the current endpoint) knows where the current endpoint is located, the current synchronization target can indicate the new synchronization target in a reply message received at block 308. As another example, the actual determination can be delayed until after the processing loop or be performed as part of another process. After the new synchronization target is determined, control then flows to block 312.

At block 312, the synchronization metadata is updated to reflect the changed consistency group endpoint-to-synchronization target mapping. The synchronization metadata located in the synchronization cache is updated by changing the synchronization target that is mapped to the current endpoint. Similarly, the synchronization metadata stored on the non-volatile storage is updated to reflect the new mapping as well. Thus, the change is made both to the synchronization cache (generally in volatile storage) and the synchronization metadata (generally in non-volatile storage). The data used for the processing loop can be updated as well. For example, the new mapping can be added at the end of the list of consistency group endpoints, allowing the new mapping to be iterated over. After the synchronization metadata is updated to reflect the changed consistency group endpoint-to-synchronization target mapping, control then flows to block 314.

Control flowed to block 314 if it was determined, at block 308, that the current synchronization target includes the current endpoint. Control also flowed to block 314 from block 312. At block 314, it is determined whether any consistency group endpoints remain to be iterated over. To determine whether any consistency group endpoints remain to be iterated over, it can be determined if the end of the list of consistency group endpoints has been reached or a variation thereof, depending on the data structure used to identify the consistency group endpoints. If it is determined that no consistency group endpoints remain to be iterated over, control then flows to block 316. If it is determined that consistency group endpoints remain to be iterated over, control then flows back to block 302.

At block 316, the processing loop ends. Once the processing loop has ended, the synchronization targets associated with the consistency groups have been connected to and updated (if stale). Thus, any write operations received can be properly replicated to consistency group endpoints associated with the data referenced by the write operations. After the processing loop ends, the process ends.

Figure 4:
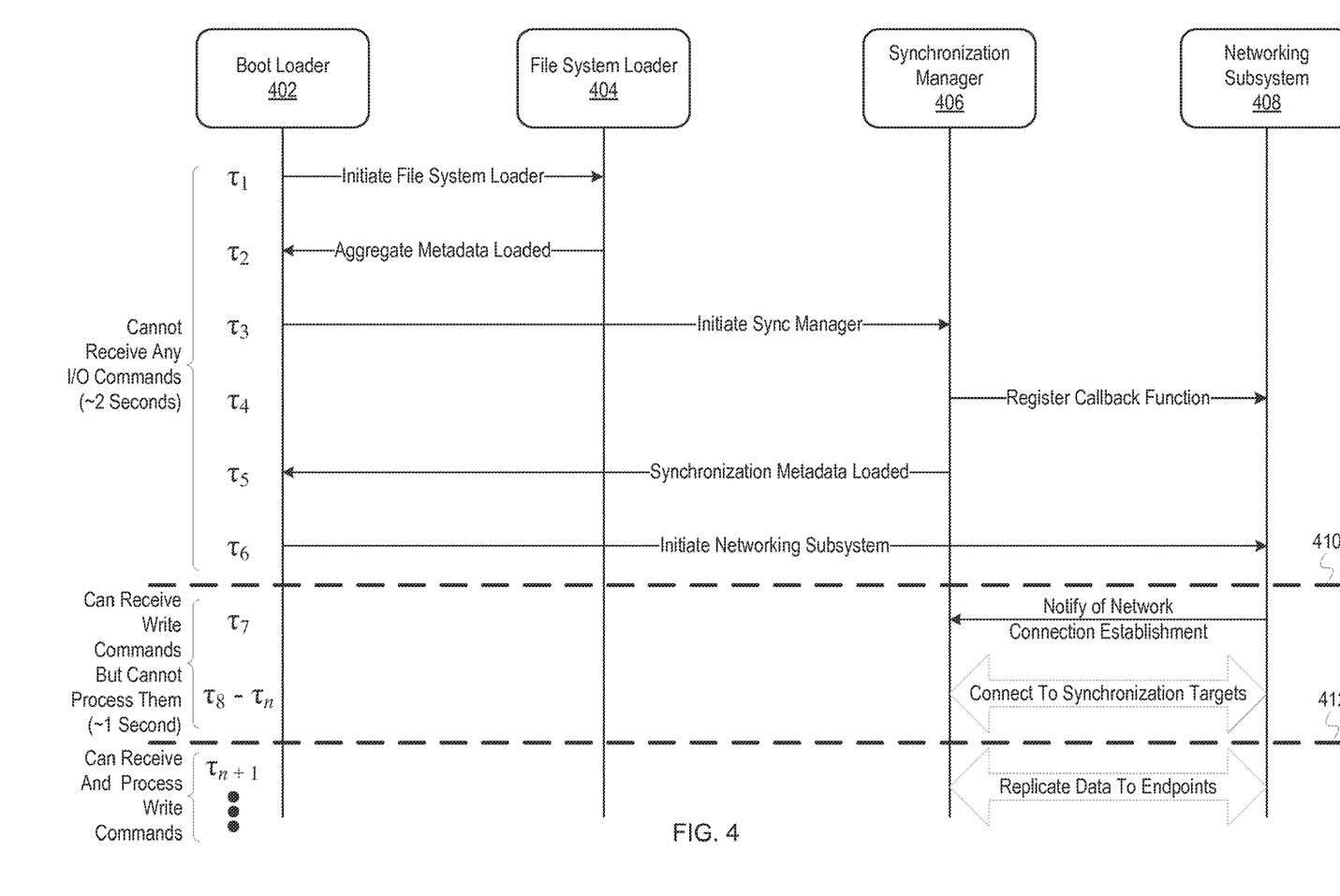
FIG. 4 depicts an example sequence diagram for determining and connecting to synchronization targets.

FIG. 4 depicts an example sequence diagram for determining and connecting to synchronization targets. FIG. 4 depicts modules of a node, including a boot loader 402, a file system loader 404, a synchronization manager 406, and a networking subsystem 408. FIG. 4 does not depict all individual operations that may be performed. For example, the boot loader 402 is loaded into memory and initiated by an external process. Similarly, the boot loader 402 might load additional instructions and the other modules, such as the file system loader 404, may call other libraries or modules. The modules depicted in FIG. 4 can be the same as the boot loader 108, file system loader 114, synchronization manager 110, and networking subsystem 112 depicted in FIG. 1.

At $\tau_1$, the boot loader 402 initiates the file system loader 404. As described above, the file system loader 404 can be initiated by loading instructions associated with the file system loader 404 and calling one or more functions that result in the instructions being executed by one or more processors.

Between $\tau_1$ and $\tau_2$, the file system loader 404 reads aggregate metadata from a known location on non-volatile storage. The aggregate metadata can then be stored in memory, such as RAM. Once the aggregate metadata is read from the non-volatile storage, the aggregate metadata can be parsed or transformed to allow the aggregate metadata to be used by other modules and processes.

At $\tau_2$, the file system loader 404 has loaded the aggregate metadata. While the file system loader 404 might continue to perform additional file system-related functions, the boot loader 402 can perform operations that are dependent on the aggregate metadata being loaded.

At $\tau_3$, the boot loader 402 initiates the synchronization manager 406. Similar to initiating the file system loader 404, the boot loader 402 can load instructions associated with the synchronization manager 406 and call one or more functions that result in the instructions being executed by one or more processors.

At $\tau_4$, the synchronization manager 406 registers a callback function that allows the networking subsystem 408 to notify the synchronization manager 406 when the network connection is functional. To register a callback function, the synchronization manager 406 can call another function, such as a kernel function, and identify the callback function using a function pointer. Registering a callback function allows the networking subsystem 408 to notify the synchronization manager 406 when the network connection is functional, as described below. Other mechanisms can be used to determine when the network connection is functional as well, such as polling the network subsystem 408 for network status information. Further, the synchronization manager 406 might communicate with a different module, such as the boot loader 402, kernel, etc. instead of the networking subsystem 408.

Between $\tau_3$ and $\tau_5$, besides registering the callback function, the synchronization manager 406 reads the synchronization metadata off of non-volatile storage. As described above, the synchronization metadata includes metadata that facilitates connecting to synchronization targets associated with consistency group endpoints. Additional operations may be performed, such as loading the synchronization metadata into a synchronization cache.

At $\tau_5$, the synchronization manager 406 has completed loading the synchronization metadata, allowing the boot loader 402 to continue performing operations that may depend on the synchronization metadata being loaded.

At $\tau_6$, the boot loader 402 initiates the networking subsystem 408. As described above, the boot loader 402 can load instructions associated with the networking subsystem 408 and call one or more functions that result in the instructions being executed by one or more processors.

Between $\tau_6$ and $\tau_7$, the networking subsystem 408 performs one or more operations to connect to a network. For example, the networking subsystem 408 might load configuration data, send various messages to network components, obtain an IP address, etc. Line 410 delineates the time at which the network connection has been established such that other network components can send and receive data over the network to and from the node on which the networking subsystem 408 is located on.

At $\tau_7$, the networking subsystem 408 notifies the synchronization manager 406 that the network connection is functional by calling the callback function registered at $\tau_4$. The networking subsystem 408 might not perform the actual notification itself, but might notify another module, such as the boot loader 402 or kernel, that actually calls the callback function. If the synchronization manager 406 uses a different mechanism to determine the availability of the network connection, the operations can be adapted accordingly. For example, it the synchronization manager 406 polls another module, $\tau_7$ would be the point at which the other module returned an indication that the network connection was functional in response to the synchronization manager's 406 polling.

At $\tau_8$-$\tau_n$, various operations are performed by the synchronization manager 406 to connect to nodes specified by the synchronization metadata. The specific operations can vary, but typically include the synchronization manager 406 exchanging a series of messages with the nodes. The synchronization manager 406 uses the networking subsystem 408 to communicate with other components connected to the network, including other nodes. Line 412, between $\tau_8$-$\tau_n$ and $\tau_{n+1}$, delineates the point in time at which the synchronization manager 406 has connected to the nodes specified in the synchronization metadata.

At $\tau_{n+1}$, the synchronization manager 406 replicates data to the synchronization targets indicated by the synchronization metadata. This functionality is enabled by loading the synchronization metadata and establishing the network connection.

The sequence diagram is divided into three time periods: $\tau_1$-$\tau_6$, $\tau_7$-$\tau_n$, and $\tau_{n+1}$ and on. During the first time period, $\tau_1$-$\tau_6$, the node cannot receive any I/O commands because the node has not established a network connection. Without a network connection, no traffic can be received over the network, including I/O commands. The second time period, $\tau_7$-$\tau_n$, occurs after the establishment of the network connect (indicated by line 410). Once the network connection is established, the node can receive I/O commands, including write commands. However, the node cannot process write commands that are replicated until a connection is established with the relevant synchronization target (typically a node). The third time period, $\tau_{n+1}$ and on, occurs after the connections have been established to the synchronization targets. During the third time period, the node can receive and process write commands because write commands that are intended to be replicated to synchronization targets can, in fact, be replicated.

Although line 412 represents the point in time at which connections are established to the synchronization targets, individual synchronization targets can be connected to over a period of time instead of all at once. For example, the synchronization manager 406 might send connection requests to synchronization targets sequentially. Further, different synchronization targets might respond at different times. As such, the node might be capable of receiving and processing some write commands earlier than other write commands. For example, if a connection has been established to a first synchronization target but not a second synchronization target, a write command that includes replicating data to the first synchronization target can be processed while a write command that includes replicating data to the second synchronization cannot be processed. Thus, in some instances, there can be multiple instances of line 412 that represent multiple points of time.

The loading of synchronization metadata is generally performed by high level software that runs late in the boot process or after the boot process has completed, which can take several minutes. Thus, any time between the establishment of a network connection and the loading of the synchronization data can result in errors or poor storage system performance. By loading the synchronization metadata early in the boot process, the synchronization manager 406 is able to begin establishing connections to synchronization targets immediately after determining that the network connection is established.

While the specific amount of time taken to establish connections to the synchronization targets can vary, the first two sections can typically be completed in less than three seconds. However, various factors can impact the boot process. For example, additional operations may be performed in some scenarios, such as when the node suffers an unplanned shut down due to a power outage. As another example, the operations involved in connecting to the synchronization targets can take a variable amount of time. For example, at least one response from a synchronization target is typically necessary to establish a connection. Thus, the length of time to complete the second section of FIG. 4 can be dependent on how long it takes to get a response from the actual synchronization targets. However, even in outlier scenarios, the node can typically begin processing write commands within thirty seconds.

Figure 5:
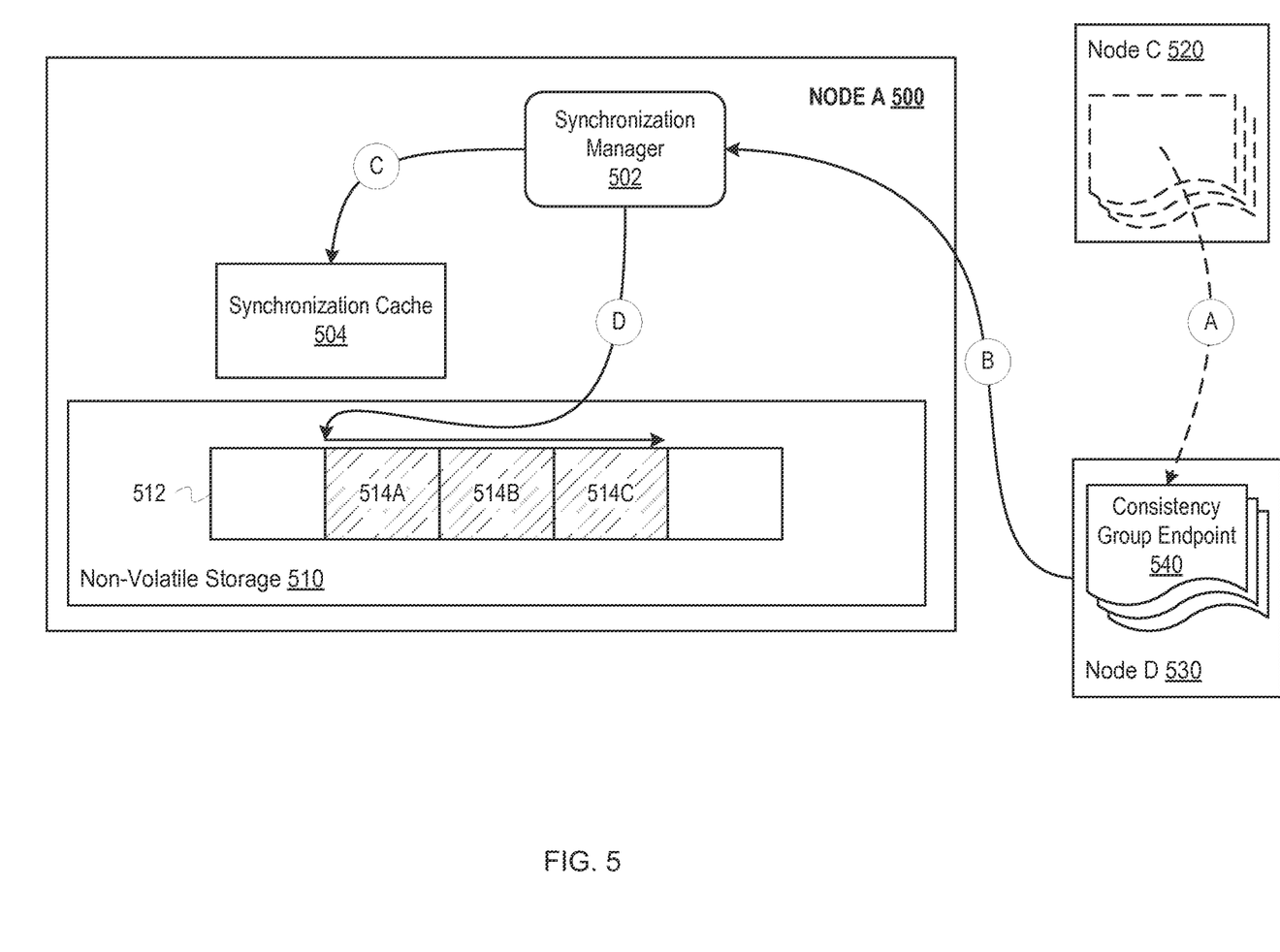
FIG. 5 depicts example operations for receiving updated synchronization metadata and updating a synchronization cache and synchronization metadata stored on non-volatile storage.

FIG. 5 depicts example operations for receiving updated synchronization metadata and updating a synchronization cache and synchronization metadata stored on non-volatile storage. FIG. 5 depicts node A 500, node C 520, and node D 530. Node A 500 includes a synchronization manager 502, synchronization cache 504, and non-volatile storage 510. The non-volatile storage 510 depicts storage media 512, including sequential blocks 514A-C. FIG. 5 also depicts a consistency group endpoint 540 being migrated from node C 520 (as indicated by the dotted outline) to node D 530. The synchronization manager 502 and the synchronization cache 504 can be the same as the synchronization manager 110 and the synchronization cache 116 depicted in FIG. 1.

At stage A, the consistency group endpoint 540 is migrated from node C 520 to node D 530. The consistency group endpoint 540 can be migrated for a variety of reasons. For example, node C 520 might be shutting down for maintenance, or a storage system manager (not depicted) might have determined that migrating the consistency group endpoint 540 to node D 530 will increase performance Because a consistency group endpoint 540 contains data that is identified as being part of a consistency group by metadata, the migration of the consistency group endpoint 540 generally comprises moving the data from node C 520 to node D 530 and updating the associated metadata.

At stage B, node D 530 notifies the synchronization manager 502 that the consistency group endpoint 540 has been migrated to node D 530. To notify the synchronization manager 502, the node D 530 can send a message to the synchronization manager 502 identifying the consistency group endpoint 540 and the node D 530. The message can also include other data, such as an identification of the node from which the consistency group endpoint 540 has been migrated from, status data associated with the consistency group endpoint 540, etc. Further, the notification might be made to a different component within node A 500. However, at some point the synchronization manager 502 or another component responsible for updating the synchronization cache 504 receives the updated data.

At stage C, the synchronization manager 502 writes the updated data to the synchronization cache 504. The synchronization manager 502 performs operations substantially similar to those described above at block 312 of FIG. 3. In particular, the synchronization manager 502 writes the updated data into the memory associated with the synchronization cache 504, which is generally located in volatile memory.

At stage D, the synchronization manager 502 updates the synchronization metadata stored in the non-volatile storage 510. The particular operations performed to update the synchronization metadata stored in the non-volatile storage 510 can vary. For example, the synchronization manager 502 can write the updated metadata directly to the non-volatile storage 510 or can flush the data in the synchronization cache 504 to the non-volatile storage 510. Further, the synchronization metadata stored on the non-volatile storage 510 can be a subset of the synchronization metadata stored in the synchronization cache 504.

Regardless of the particular mechanism used to update the synchronization metadata on the non-volatile storage 510, the synchronization metadata is written to facilitate reading the synchronization metadata. In the example depicted in FIG. 5, the synchronization manager 502 writes the synchronization metadata into three consecutive blocks 514A-C. By writing the data in three consecutive blocks, instead of non-consecutive blocks, the synchronization manager 502 eliminates or reduces the movement of a read/write head, thus decreasing the length of time taken to read the synchronization metadata off of the non-volatile storage 510. Additionally, the synchronization manager 502 may write the data in different numbers of blocks, and may write the data non-consecutively. For example, the synchronization manager 502 can write the synchronization metadata using a multilevel layout. To write the synchronization metadata using a multilevel layout, the synchronization manager 502 might write a first subset of the synchronization metadata to a first location of the non-volatile storage 510 and write a second subset of the synchronization metadata to a second, non-consecutive location of the non-volatile storage 510. The first subset of the synchronization metadata can include a pointer to the second subset of the synchronization metadata. A multilevel layout can allow the synchronization manager 502 to store the synchronization metadata that is most relevant to seeding the synchronization cache 504 at one location while storing synchronization metadata that can be loaded at a later point at a different location.

Additional techniques can be used to facilitate the efficient reading of the synchronization metadata. For example, node A 500 might include multiple types of storage devices, such as both solid state drives and hard drives. The synchronization metadata can be written to the type of storage device that results in the greatest read performance (typically a solid state drive instead of a hard drive). If the synchronization manager 502 utilizes a multilevel layout, as described above, the first subset of the synchronization metadata might be stored on a solid state drive with a pointer to the second subset of the synchronization metadata, which might be stored on a hard drive.

Further, the synchronization metadata can be "normalized". For example, there may be a large number of consistency groups, and many of the consistency groups might have endpoints on the same nodes. Instead of iterating through each consistency group entry to determine which nodes should be connected to, the unique nodes associated with consistency group endpoints can be listed separately. The list of unique nodes can then be stored in block 514A. Thus, the synchronization manager 502 can begin connecting to nodes after block 514A is read, instead of waiting until all three blocks 514A-415C are read.

As example flowcharts, FIGS. 2 and 3 present operations in an example order that can be deviated from (e.g., operations can be performed in a different order than illustrated and/or in parallel; additional or fewer operations can be performed, etc.). For example, FIG. 2 depicts synchronization metadata being read from non-volatile storage (block 202) before populating the synchronization cache with the synchronization metadata (block 204). While these operations are described as being performed sequentially, the synchronization cache can be populated with the synchronization metadata as the synchronization metadata is being read. Similarly, FIG. 3 depicts establishing connections to synchronization targets sequentially (blocks 302-316). However, connections can be established in parallel. For example, while a response from a first synchronization target is being waited on, messages can be sent to a second synchronization target. Further, if the second synchronization target sends a response before the first synchronization target, a connection can be established with the second synchronization target before the first synchronization target.

As will be appreciated by one skilled in the art, aspects of the disclosures herein may be embodied as a system, method or computer program product. Accordingly, aspects of the disclosures herein may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the disclosures herein may take the form of a program product embodied in one or more machine readable medium(s) having machine readable program code embodied thereon.

Any combination of one or more machine readable medium(s) may be utilized. The machine readable medium may be a machine readable signal medium or a machine readable storage medium. A machine readable storage medium may be, for example, a system, apparatus, or device that uses electronic, magnetic, optical, electromagnetic, infrared, or semiconductor technology, or a combination thereof. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Program code for carrying out operations for aspects of the disclosures herein may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. Examples of a machine that would execute/interpret/translate program code include a computer, a tablet, a smartphone, a wearable computer, a robot, a biological computing device, etc.

Figure 6:
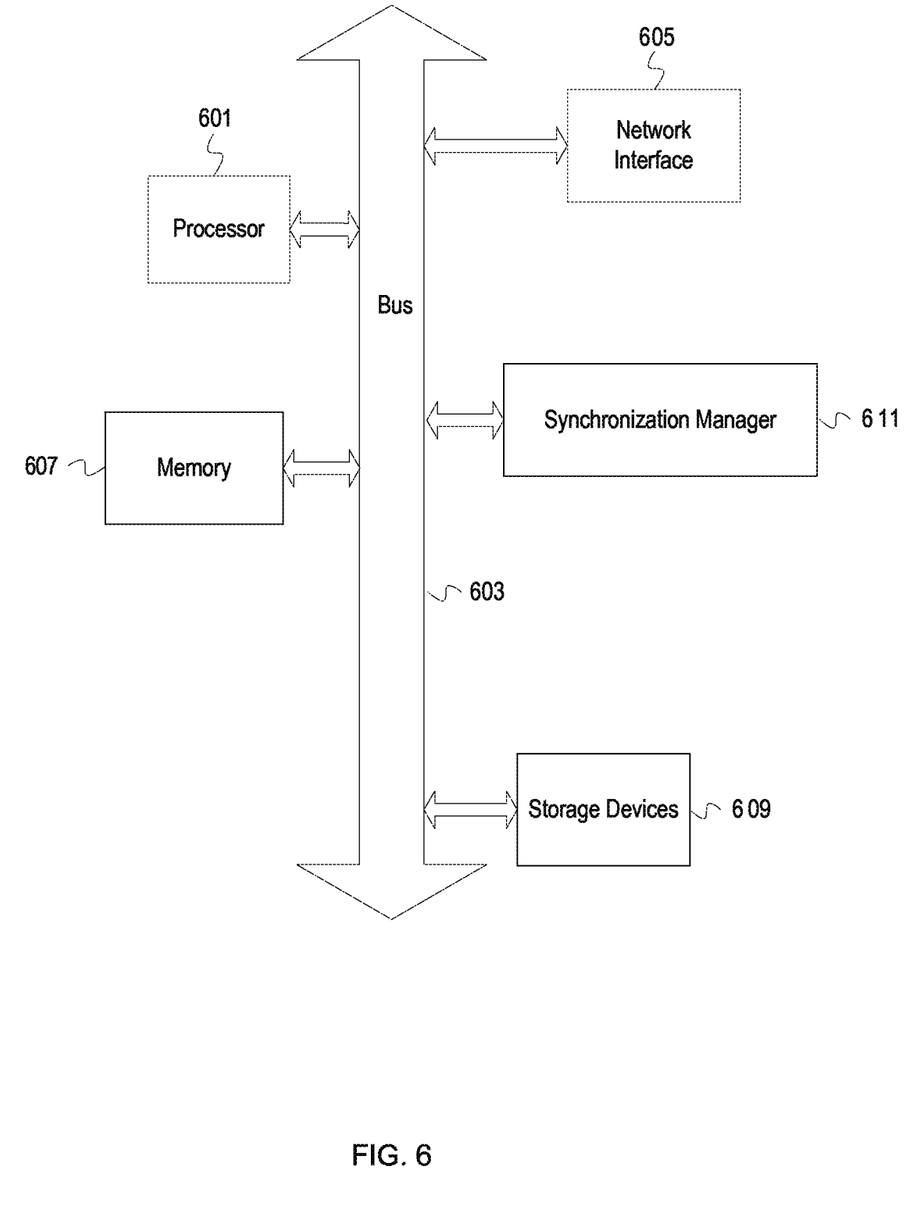
FIG. 6 depicts an example computer system with a synchronization manager.

FIG. 6 depicts an example computer system with a synchronization manager. The computer system includes a processor 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, Hyper-Transport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.) and a synchronization manager 611. The synchronization manager 611 reads synchronization metadata from non-volatile storage and populates a synchronization cache with the synchronization metadata. The synchronization manager 611 reduces the amount of time between establishment of a network connection and being able to process I/O operations by populating the synchronization cache with some or all of the synchronization metadata prior to establishment of the network connect. Any one of these functionalities may be partially (or entirely)

implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601, the storage device(s) 609, and the network interface 605 are coupled to the bus 603. Although illustrated as being coupled to the bus 603, the memory 607 may be coupled to the processor 601.

While the examples are described with reference to various implementations and exploitations, it will be understood that these examples are illustrative and that the scope of the disclosures herein is not limited to them. In general, techniques for replicating I/O commands between nodes of a clustered storage system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosures herein. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosures herein.

As used herein, the term "or" is not exclusive unless otherwise explicitly noted. Thus, the phrase "at least one of A, B, or C" is satisfied by any element from the set {A, B, C} or any combination thereof. Additionally, an I/O operation can be an input operation, an output operation, or a combination thereof.

What is claimed is:

1. A method comprising:
reading synchronization metadata when booting a first node into an operational state to identify a synchronization target as a second node;
loading the synchronization metadata into a cache of the first node, wherein the synchronization metadata maps files to replication-critical consistency groups, replication-non-critical consistency groups, and no consistency group;
loading a networking subsystem into a functional state, to establish a connection from the first node to the second node using the synchronization metadata, based upon the synchronization metadata being loaded into the cache;
receiving an operation from a client to modify a file at the first node, wherein the operation is executed upon the file at the first node and is replicated to the second node for execution upon the synchronization target;
transmitting an acknowledgement to the client that the operation is complete based upon the synchronization metadata mapping the file to a replication-critical consistency group and execution of the operation at the first node and replication of the operation at second node successfully completing; and
transmitting the acknowledgement to the client that the operation is complete based upon the synchronization metadata mapping the file to a replication-non-critical consistency group and execution of the operation at the first node successfully completing irrespective of whether the replication to the second node has completed.

2. The method of claim 1, comprising:
updating the synchronization metadata to identify the synchronization target as a third node based upon a determination that the synchronization target was migrated to the third node.

3. The method of claim 1, wherein the connection is established when booting the first node into the operational state.

4. The method of claim 1, wherein the reading comprises:
reading the synchronization metadata from sequential locations from storage.

5. The method of claim 1, comprising:
executing the operation upon the file without replicating the operation to the second node based upon the synchronization metadata mapping the file to no consistency group.

6. The method of claim 1, comprising:
populating the synchronization metadata with a first structure mapping nodes that are consistency group endpoints to synchronization targets located at corresponding nodes and a second structure listing individual synchronization targets that have consistency group endpoints.

7. The method of claim 6, comprising:
transmitting the acknowledgment, where the synchronization metadata maps the file to the replication-critical consistency group, based upon receiving a replication complete acknowledgment from the second node that replication of the operation completed.

8. A non-transitory machine readable medium comprising instructions for performing a method, which when executed by a machine, causes the machine to:
read synchronization metadata when booting a first node into an operational state to identify a synchronization target as a second node;
load the synchronization metadata into a cache of the first node, wherein the synchronization metadata maps files to replication-critical consistency groups, replication-non-critical consistency groups, and no consistency group;
load a networking subsystem into a functional state, to establish a connection from the first node to the second node using the synchronization metadata, based upon the synchronization metadata being loaded into the cache;
receive an operation from a client to modify a file at the first node, wherein the operation is executed upon the file at the first node and is replicated to the second node for execution upon the synchronization target;
transmit an acknowledgement to the client that the operation is complete based upon the synchronization metadata mapping the file to a replication-critical consistency group and execution of the operation at the first node and replication of the operation at second node successfully completing; and
transmit the acknowledgement to the client that the operation is complete based upon the synchronization metadata mapping the file to a replication-non-critical consistency group and execution of the operation at the first node successfully completing irrespective of whether the replication to the second node has completed.

9. The non-transitory machine readable medium of claim 8, wherein the instructions cause the machine to:
update the synchronization metadata to identify the synchronization target as a third node based upon a determination that the synchronization target was migrated to the third node.

10. The non-transitory machine readable medium of claim 8, wherein the connection is established when booting the first node into an operational state.

11. The non-transitory machine readable medium of claim 8, wherein the reading comprises:
reading the synchronization metadata from sequential locations in storage.

12. The non-transitory machine readable medium of claim 8, wherein the cache is implemented within a non-volatile random access memory (NVRAM).

13. The non-transitory machine readable medium of claim 8, wherein the reading comprises:
reading the synchronization metadata from multiple non-sequential locations in storage.

14. The non-transitory machine readable medium of claim 8, wherein the instructions cause the machine to:
populate the synchronization metadata with synchronization target status information of synchronization targets located at consistency group endpoints.

15. The non-transitory machine readable medium of claim 14, wherein the synchronization metadata specifies what synchronization targets contain consistency group endpoints of a consistency group.

16. The non-transitory machine readable medium of claim 8, wherein the synchronization metadata specifies synchronization targets for a replication-non-critical consistency group and synchronization targets for a replication critical consistency group.

17. A computing device comprising:
a memory comprising machine executable code; and
a processor coupled to the memory, the processor configured to execute the machine executable code to cause the processor to:
read synchronization metadata when booting a first node into an operational state to identify a synchronization target as a second node;
load the synchronization metadata into a cache of the first node, wherein the synchronization metadata maps files to replication-critical consistency groups, replication-non-critical consistency groups, and no consistency group;
load a networking subsystem into a functional state, to establish a connection from the first node to the second node using the synchronization metadata, based upon the synchronization metadata being loaded into the cache;
receive an operation from a client to modify a file at the first node, wherein the operation is executed upon the file at the first node and is replicated to the second node for execution upon the synchronization target;
transmit an acknowledgement to the client that the operation is complete based upon the synchronization metadata mapping the file to a replication-critical consistency group and execution of the operation at the first node and replication of the operation at second node successfully completing; and
transmit the acknowledgement to the client that the operation is complete based upon the synchronization metadata mapping the file to a replication-non-critical consistency group and execution of the operation at the first node successfully completing irrespective of whether the replication to the second node has completed.

18. The computing device of claim 17, wherein the machine executable code causes the processor to:
determine, over the connection with the second node, as to whether the synchronization metadata stale.

19. The computing device of claim 17, wherein the machine executable code causes the processor to:
update the synchronization metadata to identify the synchronization target as a third node based upon a determination that the synchronization target was migrated to the third node.

20. The computing device of claim 17, wherein the machine executable code causes the processor to:
update the synchronization metadata within the cache to identify the synchronization target as a third node based upon a determination that the synchronization target was migrated to the third node.

* * * * *